Aug. 13, 1929.   V. V. MESSER   1,724,358

SLUG CUTTING MACHINE

Original Filed April 5, 1924    2 Sheets-Sheet 2

INVENTOR
Vladimir V. Messer,
BY
ATTORNEY

Patented Aug. 13, 1929.

1,724,358

UNITED STATES PATENT OFFICE.

VLADIMIR V. MESSER, OF DOUGLASTON, NEW YORK, ASSIGNOR TO THE GOODYEAR TIRE & RUBBER COMPANY, OF AKRON, OHIO, A CORPORATION OF OHIO.

SLUG-CUTTING MACHINE.

Original application filed April 5, 1924, Serial No. 704,442. Divided and this application filed October 12, 1925. Serial No. 61,947.

My invention relates to stamping machines for cutting slugs of uniform volume from sheets of plastic material, and it has particular reference to a machine adapted to cut, from sheets of uncured rubber, slugs suitable for manufacture into molded rubber heels.

Heretofore, it has been customary to cut slugs for rubber heels from sheets of plastic material, by means of a die that was held manually between two relatively movable platens. After punching, the slugs were assorted and trimmed to provide blanks of the desired volume and weight necessary to fill properly the cavity of a mold for a rubber heel. Gang dies have never, to my knowledge, been used commercially in the manufacture of rubber heels, because of an inherent variation in the thickness of the stock, and also because their employment resulted in an excessive amount of waste. It has been more economical to stamp the slugs from the sheet manually than to use gang dies of the type generally employed for stamping material of uniform thickness.

One object of the invention is to provide a machine with which slugs of uniform volume may be cut from sheets of variable thickness.

Another object is to provide a gang die having a cutting tool that is adapted to cut slugs of uniform volume and of different sizes from sheets of plastic material, with a minimum waste.

Additional objects and advantages to be derived from the invention will be apparent from the accompanying specification and drawings, wherein.

Figure 1:
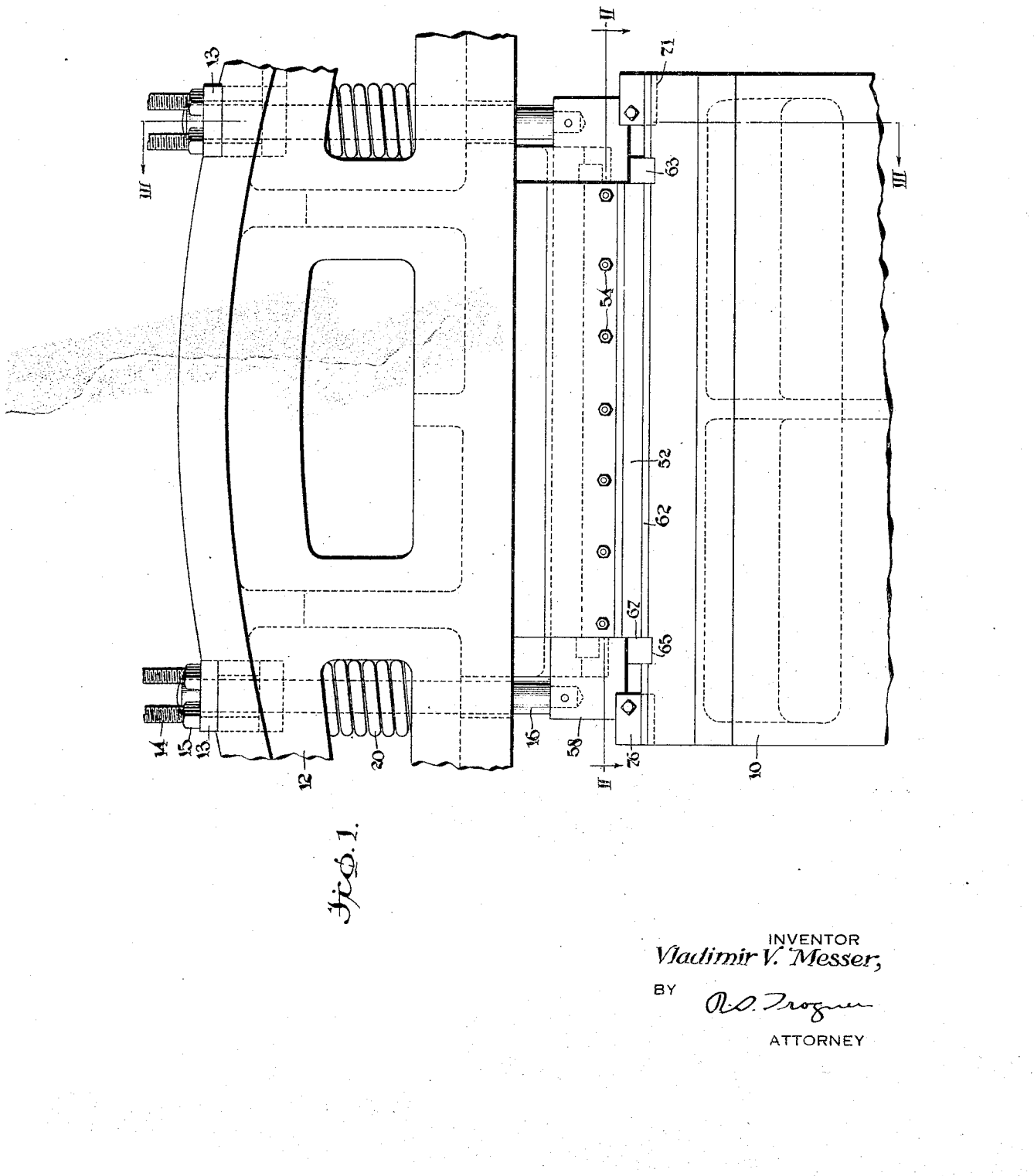
Fig. 1 is an elevational view of the discharge side of the machine, parts being broken away.
Figure 2:
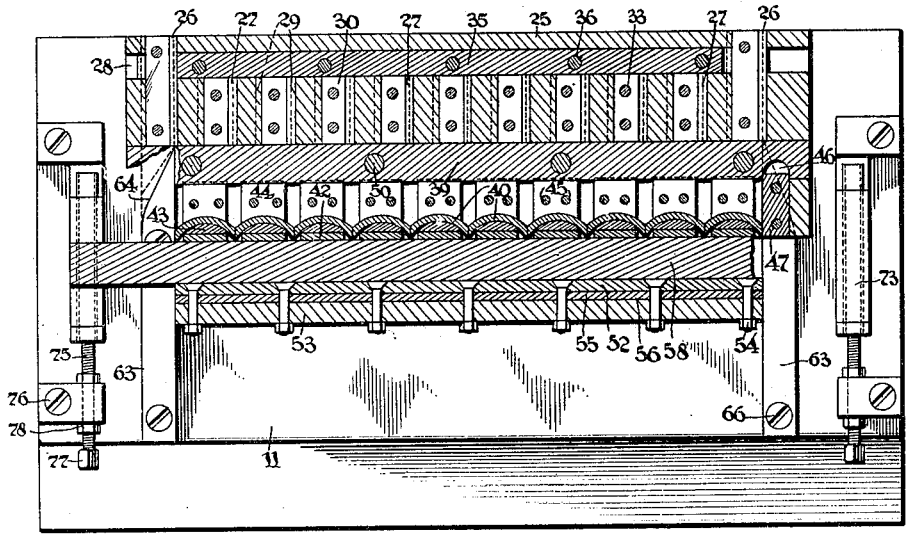
Fig. 2 is a sectional view taken substantially along the line II—II of Fig. 1, parts being broken away.
Figure 3:
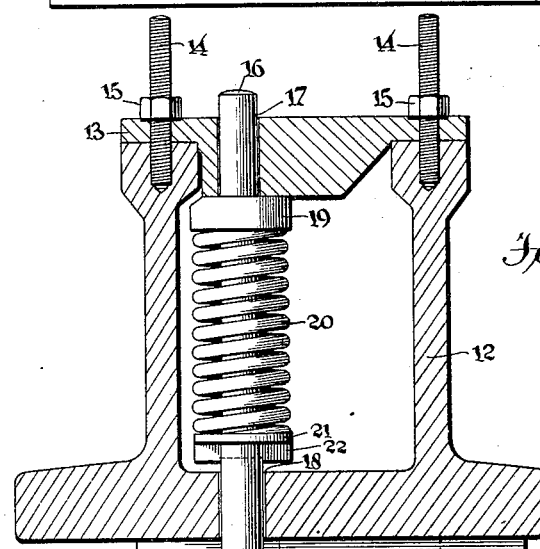
Fig. 3 is a sectional view taken on the line III—III of Fig. 1, parts being broken away.
Figure 4:
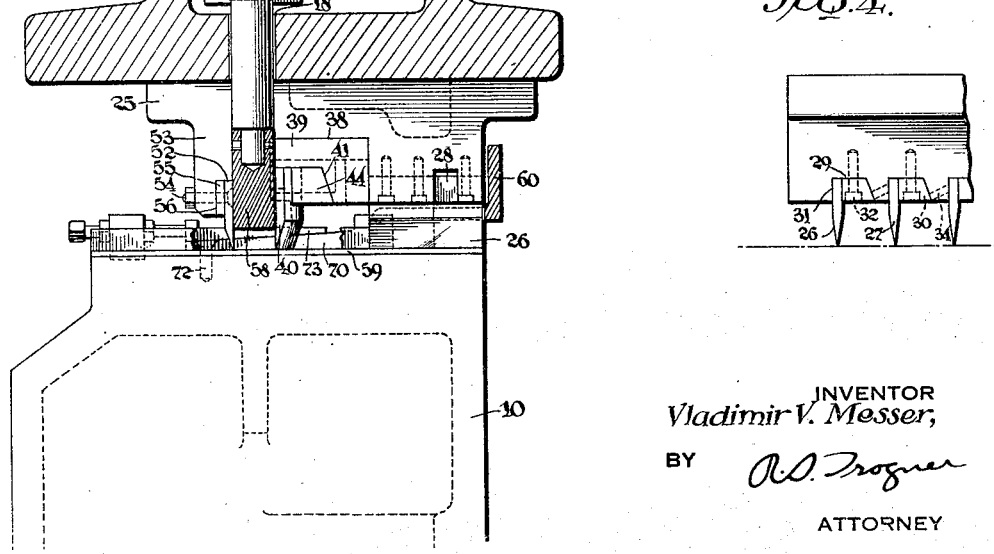
Fig. 4 is a detailed elevational view of a cutting tool.

This application is a division of an application filed April 5, 1924, Serial Number 704,442, which has matured into Patent No. 1,669,623, dated January 20, 1928.

In the copending application there is described and claimed a machine for punching out slugs of uniform volume by the operation of dies on a sheet of variable thickness, and wherein the sheet is fed to the dies in increments inversely proportional to the thickness of the sheet. The invention claimed specifically herein differs from that claimed specifically in the parent application, in that the instant embodiment contemplates a uniform periodic feeding of the sheet to the cutting dies, and compressing the material to uniform thickness before stamping the slugs therefrom.

The machine comprises a bed frame 10 having a lower stationary platen 11 over which the sheet material passes. Mounted above the bed frame 10 is a movable frame 12, which is adapted for vertical reciprocatory motion by means of suitable guides and and driving mechanism. These elements are not shown, as reciprocating means of this character are well-known, and the construction thereof forms no part of this invention, except as it contributes to the desired ends. The movable frame 12 is provided with cross-bars 13 which are secured thereto by means of threaded studs 14 and nuts 15. Guide posts 16, passing through aligned apertures 17 and 18, provided in the cross-bars and frame respectively, have collars 19 slidably mounted thereon. Surrounding each post 16 and intermediate the collar 19 and the aperture 18 is a heavy spring 20, the lower end of which abuts a collar 21, which is secured to the post 16 by a pin 22. With this construction, the springs 20 normally maintain the collars 19 and 21 against the adjacent parts of the frame 12. The posts 16 and the frame 12 tend to move as an integral unit, but if the posts be secured against movement, the frame can still move downwardly, by virtue of the loose fit of the collars 19.

A movable platen 25, positioned upon the under side of the frame 12, has secured thereto a plurality of sets of cutting knives, or dies. These comprise a set of knives to slit the material longitudinally, a set of knives to cut the separate sections of the sheet transversely at one edge of the slug, and a knife to cut the separate sections along the opposite edge of the slug.

The first set, comprising two relatively long outer knives 26, and a plurality of shorter knives 27, is adapted to cut the sheet into sections of desired width, as the material is fed into the machine. The outer knives 26, which trim the irregular edges from the sheet, have cutting edges which are longer than the advance of the material fed into the machine at each stroke, and therefore they cut continuously. The cuts made by the inner knives 27, however, do not sever the sheet into continuous strips, as it is desirable to have a small portion of unsevered material, for a purpose which will be explained presently. It is to be noted that the knives 26 and 27 are similar in shape, and differ only in their lengths.

The platen 25 is channeled to provide means to secure the knives in place. A longitudinal channel 28 is cut all the way across the platen, and then transverse wedge shaped channels 29 are cut through at the required number of points. The knives are placed in the transverse channels, and are secured in position by means of wedges 30, which force the knives against the straight faces 31 of the channels 29. The wedges are secured by suitable means, such as screws 32, which pass through apertures 33 in the wedges, and they may be further secured by means of dowel pins 34, disposed at an angle to the knives. A bar 35, machined to proper size, is inserted in the channel 28 to prevent lateral displacement of the knives, and it is secured to the platen 25 by screws passing through holes 36.

The central portion of the platen 25 is provided with a longitudinal channel 38 adapted to receive a block 39 in which is fixed a plurality of knives 40, disposed to cut across the sheet rather than longitudinally thereof, and curved to form slugs of the desired shape. The underside of the block 39 is provided with a recess having a tapered face 41, and a depending lug 42 to which is secured a plurality of arcuate members 43, against which the knives 40 are positioned. Each knife is secured by a wedge 44 having opposed faces which conform to the tapered face 41 and the curve of the knife, respectively. Suitable means, such as bolts 45, may be employed to secure the wedges 44 to the block 39. Longitudinal channels 46 are provided at either end of the block, and are adapted to receive filler blocks 47 which prevent lateral movement of the knives 40 and wedges 44. The assembled block 39 is secured to the platen 25 by means of screws 50.

The third knife unit 52, which may have but one continuous edge, is secured to a depending lug 53 on the discharge side of the platen 25, by suitable means, such as bolts and nuts 54. Shims 55, interposed between the knife 52 and the face 56 of the lug 53, may be employed to adjust the distance between the knife 52 and the knives 40. The knives 26, 27, 40, and 52, are positioned in the platen 25 with their cutting edges in the same plane, and hence they operate simultaneously.

The posts 16 support a presser foot 58, positioned between the transverse cutting knives 40 and 52, and which is made of such shape as to fill substantially all of the space between them. The lower portion of the presser foot is normally a slight distance below the plane of the knife edges and thus contacts first with the material as the frame 12 moves downwardly, to compress and spread out the sheet to a uniform gauge before the actual cutting operation occurs. As the sheet is compressed, excess material flows to either side of the knives 40 and 52, and into the portions of the sheet which were unsevered by the successive cuts of the knives 27. The unavoidable amount of waste is accordingly retained in one piece, and there are no small scraps of material which can creep beneath the knives and interfere with proper operation. By properly adjusting the length of the knives and the amount of stock fed into the machine at each stroke, the percentage of waste can be reduced to a minimum.

The lower platen 11 is provided with auxiliary devices which facilitate operation of the machine.

One device consists in the provision of an aluminum plate 59, over which the sheet passes. It is necessary that the knives cut through the resilient material, but if they are forced against a hard metal plate, their edges will be turned. If a wooden plate be employed, the wood is quickly cut away and the material flows into the voids and is not cleanly severed. Lead is open to substantially the same objection. It has been found that aluminum is sufficiently hard to insure a clean cut, and sufficiently soft to permit the knives to retain their cutting edges.

A stripper plate 60, secured to the frame 10 on the intake side of the machine, is provided with fingers projecting between the knives 26 and 27. This plate prevents the sheet of material from being carried upwardly by the knives, and provides a means to separate the sheet from them, in case they should adhere to each other.

Selvage guides are indicated at 63. These devices are secured on opposite sides of the platen 11, and are provided with beveled edges 64 adjacent the intake side of the machine, which direct waste material cut from the outer portions of the sheet by the knives 26, away from the cutting tools. The guides are secured in recesses 65 formed in the platen 11, by suitable means such as screws 66. Each guide has an upstanding portion 67, which prevents the sheet from expanding sideways when it is compressed by the foot 58, and which insures a uniform width of passage for the portion of the sheet from which the slugs are stamped.

The limit of travel of the presser foot 58 is determined by means of adjustable wedge members positioned in either side of the platen 11. Each unit comprises a wedge 70 secured in a recess 71 by screws 72, and a second wedge 73, slidably mounted on the first. The upper wedge may be moved, or held in fixed relation, by a screw 75 passing through a fixed block 76, and provided with a head 77, by means of which it may be turned. It is preferable to provide lock nuts 78 on either side of the block 76, as the vibrations to which the machine is subjected may cause the screw 75 to move if it is not secured.

In operation, a sheet of material, such as unvulcanized rubber, is periodically fed into the machine between knife carrying platen 25 and the stationary platen 11. The advance of the sheet occurs as the frame 12 moves upwardly, in order to present a fresh surface of stock to the knives on the next cutting stroke. As the frame 12 moves downwardly, the presser foot 58, positioned below the plane of the knives, contacts with the material which has been cut longitudinally by the knives 26 and 27 on the previous stroke of the machine, and reduces the thickness of the stock by spreading it out into the unsevered portions of the sheet. The limit of travel of the presser foot, and hence the gauge of the stock, is determined by proper adjustment of the wedges 73. The degree of compression may be varied by adjusting the tension in the springs 20 by moving the nuts 15.

The knives 26, 27, 40 and 52 cut the stock on either side of the presser foot, being driven through by the continued downward movement of the frame 12. The machine is then in the position shown in the drawings. It will be noted that the knives are in contact with the aluminum plate 59, that the springs 20 are compressed and that the fixed collar 21 is not in contact with the frame, and also that the presser foot 58 is seated at its extremities on the wedges 73. Inasmuch as the sheet has been spread out to uniform gauge, and since the knives are in fixed relation to each other, the slugs cut will each have the same volume. The only waste is the slight amount on either side of the sheet, trimmed off by the knives 26, and removed by the guides 63, and the excess of the feed of material over the distance between the knives 40 and 52.

A considerable increase in production is obtained by employing a gang die, since a large number of slugs are stamped out at each stroke of the machine. By the old hand cutting method, but one slug could be formed for each stroke, and these slugs were not uniform in volume. The employment of a gang die is rendered commercially possible by providing means to insure a uniformity of thickness, and hence of volume, in each slug.

It is obvious that the modification described herein is susceptible of various changes without departing from the principles of the invention. It is intended, therefore, that only such limitations should be imposed as are set forth in the appended claims.

What I claim is:

1. A machine for forming slugs of uniform volume from sheet material comprising a fixed frame and a reciprocating frame, a plurality of pairs of independent cutting elements mounted in the reciprocating frame, and a presser foot resiliently supported in the reciprocating frame for engagement with the sheet between the elements of all of said pairs of cutting elements.

2. A machine for cutting slugs of uniform volume from a sheet of resilient material comprising a fixed frame, a reciprocating frame having cutting means, a presser foot mounted above the fixed frame, means on the fixed frame to limit the travel of the presser foot and means on the reciprocating frame permitting additional movement thereof after the presser foot has come to rest.

3. A machine for cutting slugs from a sheet comprising a fixed platen, a frame mounted for reciprocation with respect thereto, means carried by the frame for severing the sheet longitudinally, a plurality of pairs of spaced knives carried by the frame for transversely severing the sheet, and a presser foot carried by the frame for engagement with the sheet between the knives of each pair.

4. A machine for cutting slugs from a sheet comprising a fixed platen, a frame mounted for reciprocation with respect thereto, means carried by the frame for severing the sheet longitudinally, a plurality of pairs of spaced knives carried by the frame for transversely severing the sheet, and a presser foot yieldingly carried by the frame for engagement with the sheet between the knives of each pair.

5. A machine for cutting slugs from a sheet comprising a fixed platen, a frame mounted for reciprocation with respect thereto, means carried by the frame for severing the sheet longitudinally, a plurality of pairs of spaced knives carried by the frame for transversely severing the sheet, a presser foot carried by the frame for engagement with the sheet between the knives of each pair, and means carried by the platen for limiting movement of the presser foot.

6. A machine for cutting slugs from a sheet comprising a fixed platen, a frame mounted for reciprocation with respect thereto, means carried by the frame for severing the sheet longitudinally, a plurality of pairs of spaced knives carried by the frame for transversely severing the sheet, a presser foot carried by the frame for engagement with the sheet between the knives of each pair, and means carried by the platen for limiting movement of the presser foot while permitting movement of the knives into contact with the platen.

7. A machine for cutting slugs from a sheet comprising a fixed platen, a frame mounted for reciprocation with respect thereto, means carried by the frame for severing the sheet longitudinally, a plurality of pairs of spaced knives carried by the frame for transversely severing the sheet, a presser foot carried by the frame for engagement with the sheet between the knives of each pair, and adjustable means carried by the platen for limiting movement of the presser foot toward the platen to predetermine the thickness of the slugs cut.

In witness whereof, I have hereunto signed my name.

VLADIMIR V. MESSER.